United States Patent [19]

Ohtsuka

[11] Patent Number: 4,987,591
[45] Date of Patent: Jan. 22, 1991

[54] ELECTRONIC TELEPHONE APPARATUS ABLE TO SUPPLY SYNC CLOCK SIGNALS RELIABLY, AND METHOD OF CONTROLLING THE SUPPLY OF SYNC CLOCK SIGNALS

[75] Inventor: Eiji Ohtsuka, Hino, Japan

[73] Assignee: Kabushiki Kaisha Toshiba, Kawasaki, Japan

[21] Appl. No.: 361,517

[22] Filed: Jun. 5, 1989

[30] Foreign Application Priority Data

Jun. 6, 1988 [JP] Japan ................................. 63-138716

[51] Int. Cl.$^5$ ............................................. H04Q 3/56
[52] U.S. Cl. ..................................... 379/279; 379/290
[58] Field of Search ....................... 379/242, 290, 279; 370/13; 328/133, 134

[56] References Cited

U.S. PATENT DOCUMENTS 4,123,704 10/1978 Johnson .......................... 328/134 X
4,229,816 10/1980 Breidenstein et al. ............ 370/13 X
4,802,209 1/1989 Hasegawa ....................... 379/210 X Primary Examiner—James L. Dwyer
Attorney, Agent, or Firm—Finnegan, Henderson, Farabow, Garrett, and Dunner

[57] ABSTRACT

An electronic telephone apparatus comprising a trunk circuit, a sync signal generating circuit, an oscillator circuit, a selector, and a time-division switch. The trunk circuit is connected between a digital line and a highway, for transmitting signals therebetween and extracting sync clock pulses from the digital line. The sync signal generating circuit is connected to the trunk circuit, for generating a first reference clock signal of a predetermined frequency from the clock pulses extracted by the trunk circuit. The oscillator circuit generate a second reference clock signal similar to the first reference sync signal. The selector monitors the first reference clock signal, it selects the first reference clock signal when no abnormality is found in the first reference clock signal, and selects the second reference clock signal when abnormality is found in the first reference clock signal. The time-division switch is driven by the reference clock signal output from the selector means, for performing time-division multiplexing on the data being transmitted through the highway. The electronic telephone apparatus can continuously perform its function even if the sync clock signal extracted from the digital line is not input to it due to the malfunction of the trunk circuit.

9 Claims, 8 Drawing Sheets

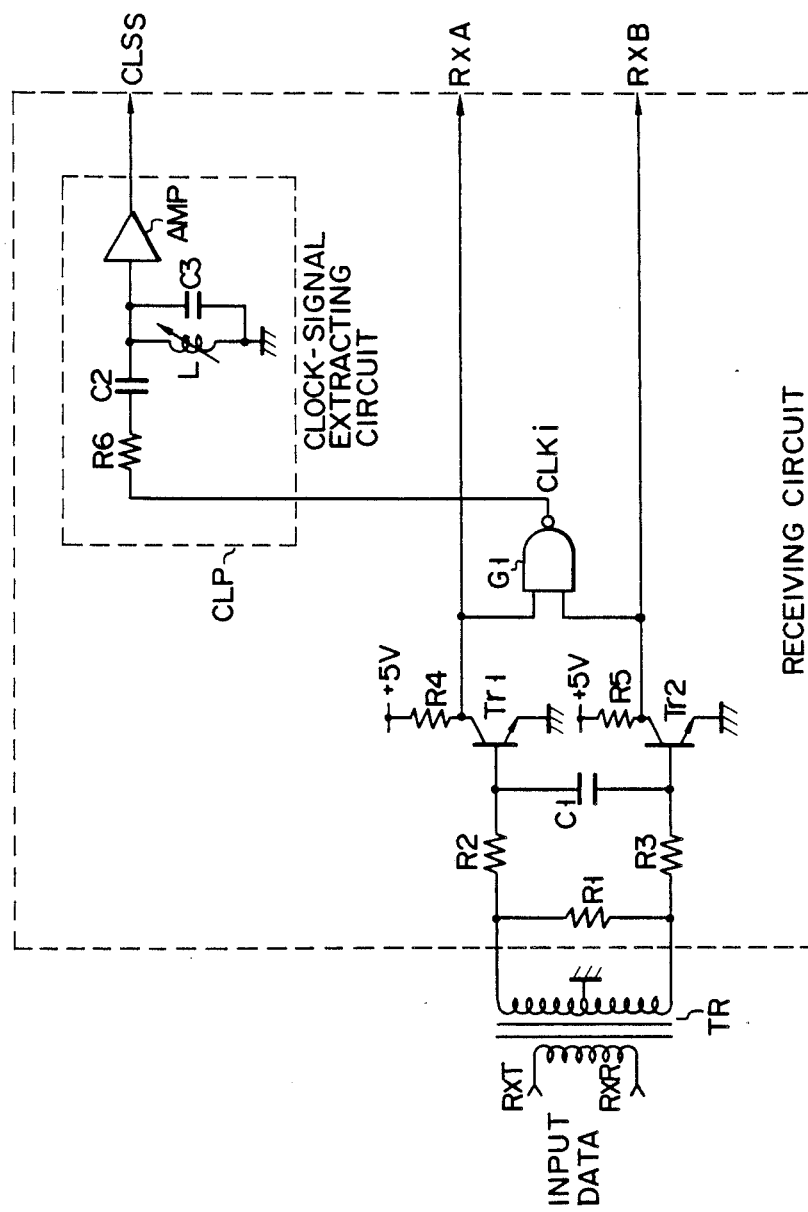
F I G. 3

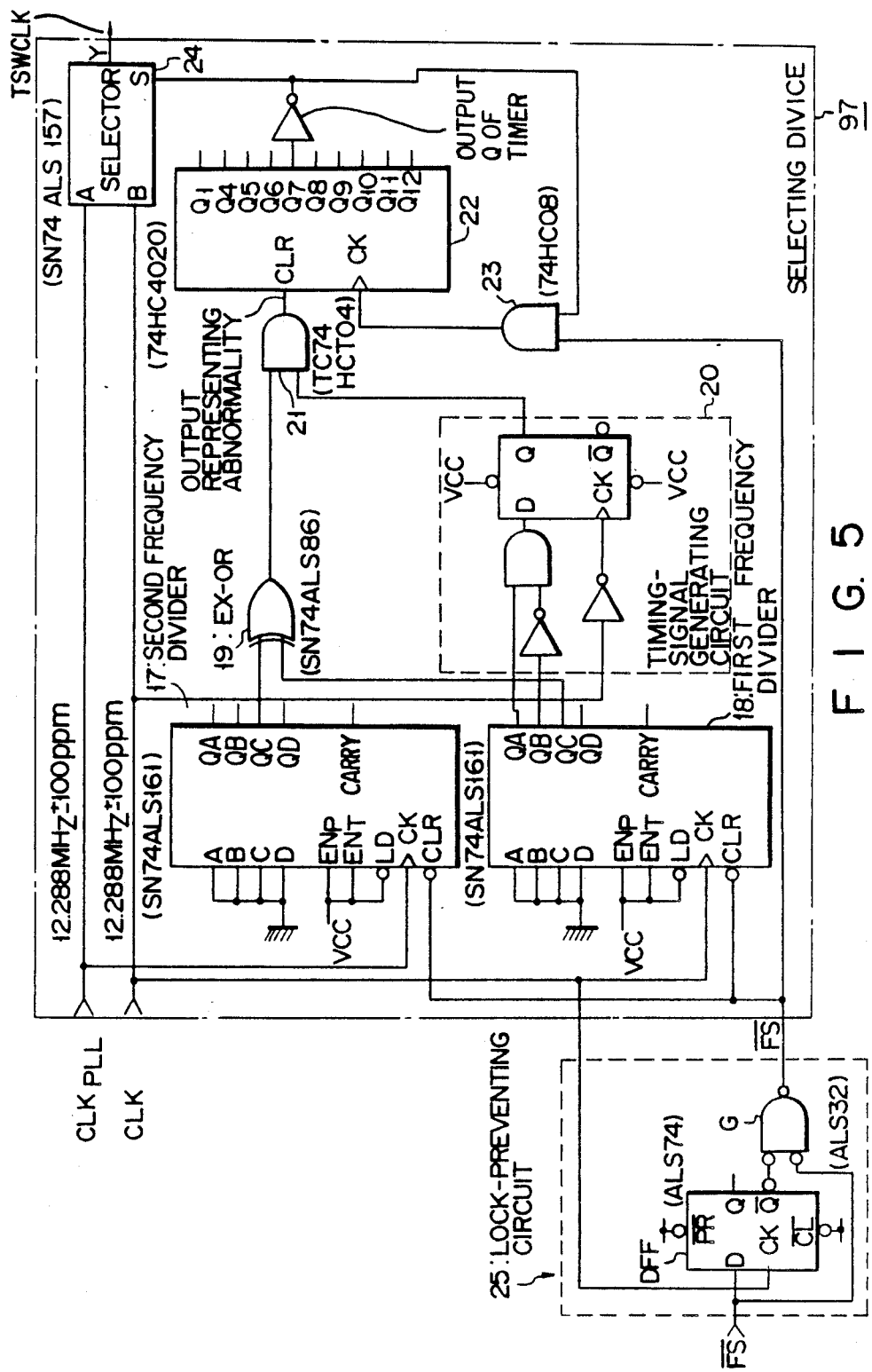
F I G. 5

ELECTRONIC TELEPHONE APPARATUS ABLE TO SUPPLY SYNC CLOCK SIGNALS RELIABLY, AND METHOD OF CONTROLLING THE SUPPLY OF SYNC CLOCK SIGNALS

BACKGROUND OF THE INVENTION

1. Field of the Invention

The present invention relates to an electronic telephone apparatus for controlling the switching of telephone lines, and more particularly to an electronic telephone apparatus which can reliably supply sync clock signals, and also to a method of controlling the supply of sync clock signals.

2. Description of the Prior Art

An electronic telephone apparatus is designed to switch telephone lines. An typical example is disclosed in U.S. Pat. No. 4,802,209 (Jan. 31, 1989). Generally, the electronic telephone apparatus has line circuits for connecting telephones, a control unit, trunk circuits, a memory, a tone signal source unit, and an exchanging switch. Telephones are connected to the line circuits. The line circuits are interfaces, each assigned to a specific telephone number. The line circuits function as connection interfaces, connecting themselves with the exchanging switch. The trunk circuits function as interfaces between the exchanging switch and a station line. The exchanging switch performs switching between the trunk circuits, on the one hand, and the line circuits, on the other, and also performs switching among the line circuits. The control unit controls the exchanging switch in accordance with the dial data input through the trunk circuits or the line circuits. It also controls the other components of the apparatus. The memory stores various programs and various tables which the control unit executes and refers to, in order to perform switching, various tables; it also stores data representing the functions set to the apparatus. The tone signal source unit is designed to generate various tone signals informing of the conditions of the apparatus, such as ringing-tone signals and busy-tone signals.

When any telephone connected to one of the line circuits generates an off-hook signal, this line circuit supplies the off-hook signal to the control unit. Then, the line circuit transmits the dial data supplied from the telephone to the control unit. The control unit determines the receiving telephone from the dial data, and controls the exchanging switch such that a telephone line is connected to the line circuit or the trunk circuit which is connected to the receiving telephone. When the control unit receives a confirmation signal from the trunk circuit, it supplies a ringing-tone signal to the line circuit specified by the dial data or the like contained in the confirmation signal, or to the line circuit specified by the data stored in the memory, unless the telephone connected to the line circuit is busy. As a result, the receiving telephone rings. When the receiving telephone is uncradled by the respondent, the control unit controls the exchanging switch such that the line circuit connected to the receiving telephone is connected to the trunk circuit. Hence, the sender and the respondent can talk through the telephone.

The exchanging switches recently developed comprise time division switches (hereinafter referred to as TSWs) that are designed to perform time-division multiplex transmission of digital data. An input line and an output line are connected to a TSW. These lines are highways for transmitting PCM (Pulse Code Modulated) signals. (Hereinafter, the input line and the output line will be called "input PCM highway" and "output PCM highway," respectively.) A PCM codec for converting speech signals to PCM codes is connected to both the input PCM highway and the output PCM highway. Further, a trunk circuit is connected to the input PCM highway and the output PCM highway. This trunk circuit connects both PCM highways to a telephone network. A telephone is connected to the PCM codec by a line control circuit which functions as an interface.

Fundamental dyadic telephone talk is achieved in the following way. First, a sender takes up the receiver of the telephone and dials the number of the receiving telephone. As a result, the calling telephone generates an off-hook signal and a dial signal. These signals are detected by means of the loop monitoring performed by the line control circuit, and are output as serial data to the data highway of a control unit under the control of the control unit. The data on the data highway is input to a CPU circuit which performs various operations and various controls. The CPU circuit analyzes the dial signal in accordance with a program, thereby providing data for generating a ring-tone signal which is to be supplied to the receiving telephone of the number specified by the dial signal. This data is output to the data highway and supplied to the line control circuit. The control circuit generates a ring-tone signal from the input data. The ring-tone signal is transmitted to the receiving telephone. When the receiving telephone makes a response, the CPU circuit gives a command via the control circuit to the codecs coupled to the calling and receiving telephones, thus activating these codecs so that the sender and the respondent can talk through the telephone. Either codec is on standby until it receives the command. In other words, it becomes active upon receipt of the command and performs AD/DA (Analog-to-Digital, Digital-to-Analog) conversion of speech data.

The CPU circuit performs the exchanging of speech data between the calling telephone and the receiving telephone. It also controls the TSWs in order to achieve time-division multiplex transmission of the speech data. The PCM codes supplied from the codecs of the calling and receiving telephones are input to one of the TSWs via a receiving PCM highway PCM IN. The TSWs exchanges the PCM codes. The PCM codes, thus exchanged, are output to a receiving PCM highway PCM OUT. In most telephone systems, PCM data for 32 channels is multiplexed on each PCM highway. From a viewpoint of time series, the PCM data has 32 time slots. For instance, the PCM data of the first telephone is assigned to the first time slot, that of the second telephone to the second time slot, and so forth. To accomplish a dyadic talk between the first telephone and the second telephone, it suffices to exchange the PCM data items of these telephones with each other.

To achieve this exchange of PCM data items, to drive the TSWs thereby to control the time slots, and to drive the PCM codecs, the control circuit, and the like, a drive clock signal is required. This clock signal is generated from the clock pulses output by an oscillator circuit if the electronic telephone apparatus is used in combination with a telephone network which comprises analog lines.

On the other hand, if the electronic telephone apparatus is used in combination with a telephone network which comprises digital lines, the drive clock signal is generated from the sync clock signal supplied via these digital lines, so that the electronic telephone apparatus can accurately synchronize the data being transmitted by the digital lines.

In most cases, a PCM codec outputs a PCM code every 125 microseconds. Hence, data of 2.048 Mb is transmitted every section via a PCM highway. Therefore, a 2.048 MHz clock signal is used to drive the codec. To synchronize the data transmitted at such a high speed through digital lines, the electronic telephone apparatus uses the drive clock signal generated from the sync clock signal supplied through the digital lines. The sync clock signal also is supplied via the trunk circuit. The trunk circuit is usually mounted on a printed circuit board which is incorporated in the electronic telephone apparatus. This arrangement may cause problems. It is possible that the connector connecting the printed circuit board to the other components of the telephone apparatus fails to function. In addition, if the print circuit board is disconnected from the telephone apparatus for inspection, the sync clock signal is no longer supplied through the trunk circuit. Consequently, the electronic telephone apparatus stops functioning, and telephone talks can no longer be achieved.

SUMMARY OF THE INVENTION

The first object of the present invention is to provide a reliable electronic telephone apparatus which can function even if the sync clock signal supplied via a digital line is not input to it due to the trouble with the trunk circuit incorporated in it.

To attain this object, according to the present invention there is provided an electronic telephone apparatus which comprises: a trunk circuit connected between a digital line and a highway transmitting signals therebetween and extracting sync clock pulses from the digital line; a sync signal generating circuit connected to the trunk circuit, for generating a first reference sync signal of a predetermined frequency from the clock pulses extracted by the trunk circuit; an oscillator circuit for generating a second reference sync signal similar to the first reference sync signal; a selector circuit for monitoring the first reference sync signal, selecting the first reference sync signal when no abnormality is found in the first reference sync signal, and selecting the second reference sync signal when abnormality is found in the first reference sync signal; and a time-division switching circuit driven by the reference sync signal output from the selecting circuit, for performing time-division multiplexing on the data being transmitted through the highway.

The trunk circuit not only transmits signals between the digital line and the highway, but also extracts sync clock pulses from the digital line and supplies them to the sync signal generating circuit. The sync signal generating circuit generates the first reference sync signal from the sync clock pulses. Meanwhile, the oscillator circuit generates the second reference sync signal similar to the first reference sync signal, and supplies the second reference sync signal to the selector circuit. The selector circuit monitors the first reference sync signal. When no abnormality in the first reference sync signal, the selector circuit selects this signal and outputs it to the time-division switching circuit. When abnormality is found in the first reference sync signal, the selector circuit selects the second reference sync signal and outputs this signal to the time-division switching circuit.

The time-division switching circuit is driven by the reference sync signal output from the selector circuit, and performs time-division multiplexing on the data being transmitted through the highway. The electronic telephone apparatus can, therefore, continuously perform its function even if the sync clock signal supplied via a digital line is not input to it due to problems with the trunk circuit.

Unless the selector circuit switches the reference sync signal from the first to the second within a short time from the occurrence of the abnormality in the first reference sync signal, the time-division switching circuit may fail to accomplish a successful time-division multiplexing of the data on the highway. More specifically, a time-lag of as little as several milliseconds would prevent the switching circuit from performing flawless time-division multiplexing. In such an event, the speech heard at either telephone would discontinue or contain noise. In the worst case, the electronic telephone apparatus could not achieve telephone talk at all.

Accordingly, the second object of the present invention is to provide a more reliable electronic telephone apparatus wherein the time-division switching circuit can switch the reference sync signal within a short time after abnormality has been found in the first reference sync signal.

In order to accomplish the second object, according to the invention there is provided an electronic telephone apparatus which is identical to the apparatus described above, except that the selector circuit comprises a counter circuit and a switching circuit. The counter circuit counts the clock pulses of the first reference sync signal and those of the second reference sync signal, which have been generated every predetermined period of time, and outputs a switching signal whenever the difference in number between the clock pulses of the first reference sync signal and those of the second reference sync signal increases over a predetermined value. The switching circuit switches the reference sync signal from the first reference sync signal to the second reference sync signal in response to the switching signal output from the counter circuit.

In this electronic telephone apparatus, the number of the clock pulses of the first reference sync signal, which has been generated for a predetermined period of time, is compared with that of the clock pulses of the second reference sync signal, which have been generated for the same period of time. When the difference in number between the clock pulses of the first reference sync signal and those of the second reference sync signal increases over the predetermined value, it is determined that the first reference sync signal is abnormal, and the switching circuit switches the reference sync signal from the first signal to the second signal.

In other words, the first reference sync signal is replaced by the second reference sync signal as soon as the first reference sync signal becomes unstable when the printed circuit board, on which the trunk circuit is formed, is electrically disconnected from the electronic telephone apparatus, or when a problem occurs either in the printed circuit board or in the signal line to which the trunk circuit is connected. Thus, the electronic telephone apparatus neither stops functioning, nor renders telephone talks impossible.

The third object of the present invention is to provide a method of supplying a sync clock signal within an electronic telephone apparatus, which remains stable even if the sync clock signal supplied via a digital line is not input to the apparatus due to problems with the trunk circuit used in the apparatus, whereby the electronic telephone apparatus can reliably operate.

To achieve the third object, according to the present invention there is provided a method of supplying a sync clock signal within an electronic telephone apparatus, the method comprising the steps of: causing an oscillator circuit incorporated in the apparatus to generate a first reference clock signal; generating a second reference clock signal of the same frequency as that of the first reference clock signal, from a clock signal extracted from a digital line; monitoring the second reference clock signal to determine whether or not the second reference clock signal has abnormality; and using the second reference clock signal as the reference clock signal for the apparatus when the second reference clock signal has no abnormality, and using the first reference clocks signal as the reference clock signal for the apparatus when the second reference clock signal is abnormal.

In this method, the oscillator circuit incorporated in the electronic telephone apparatus generates the first reference clock signal, and the second reference clock signal, which has the same frequency as that of the first reference clock signal, from the clock signal extracted from a digital line. Then, it is determined whether or not the second reference clock signal is abnormal. When the second reference clock signal is not abnormal, it is used as the reference clock signal for the apparatus. Conversely, when the second reference clock signal is abnormal, the first reference clocks signal is used as the reference clock signal for the apparatus.

BRIEF DESCRIPTION OF THE DRAWINGS

FIG. 3 is a circuit diagram showing the receiving circuit incorporated in the embodiment of FIG. 1;

FIG. 5 is a circuit diagram showing the switching device used in the embodiment of FIG. 1;

DETAILED DESCRIPTION OF THE PREFERRED EMBODIMENTS

Figure 1:
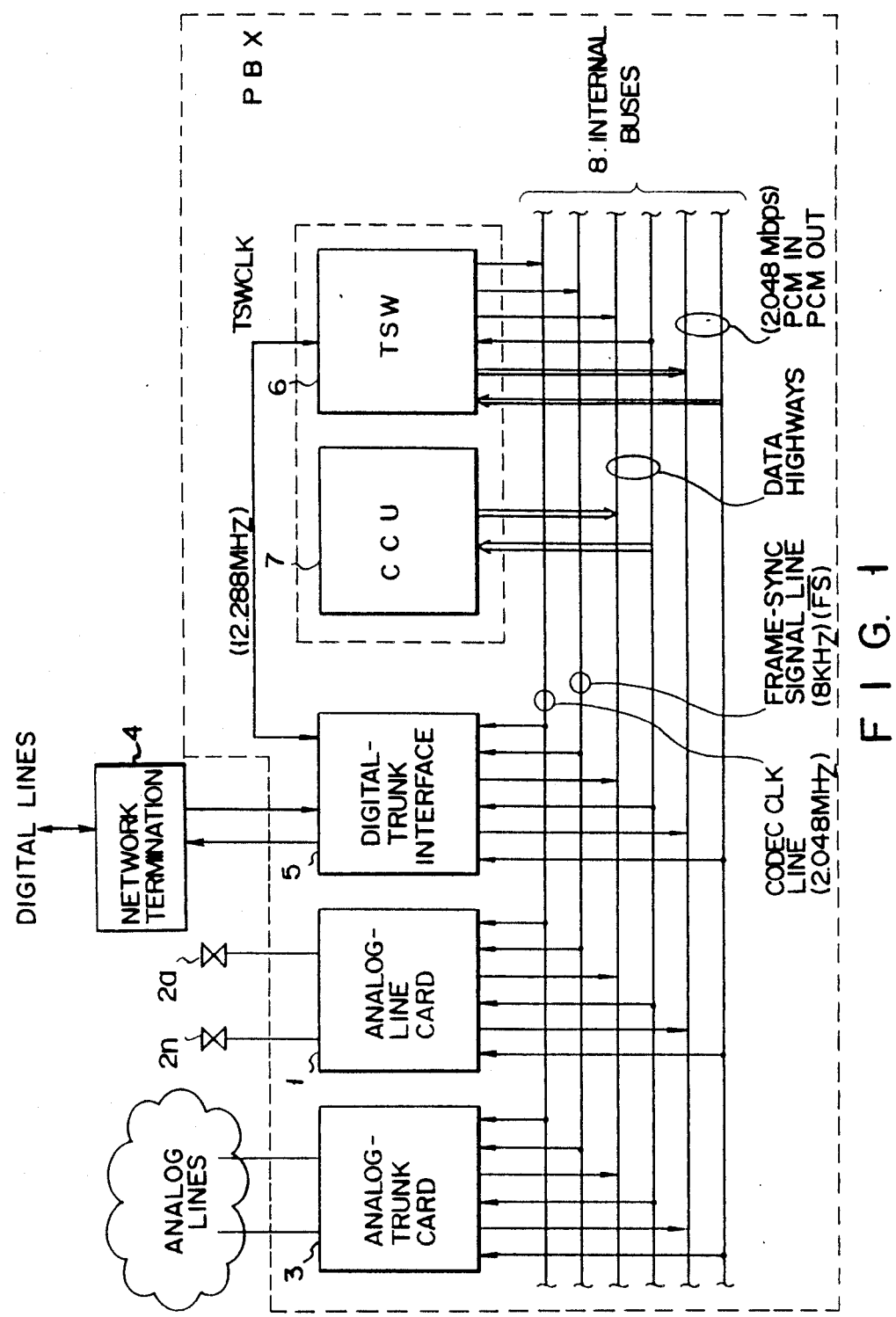
FIG. 1 is a block diagram showing an embodiment of the present invention.

FIG. 1 is a block diagram showing an electronic telephone apparatus according to the present invention. As is shown in FIG. 1, telephones 2a to 2n are connected to an analog-line circuit assembly card 1. An analog-trunk circuit assembly card 3 is connected analog lines. A line-terminal device 4 is coupled to digital lines, connecting a digital-trunk circuit assembly card 5 to the digital lines. A time-division switch (TSW) 6 and a central control unit (CCU) 7 are connected to internal buses 8. The internal buses 8 include two PCM highways, two data highways, one frame-sync signal line, and a codec lock-signal line. Also, a line (not shown) for transmitting a data clock signal, which is used for extracting a control data, is provided.

The TSW 6 performs time-division multiplex transmission of digital data. The TSW 6 controls the data in the unit of a time slot, which has been supplied to it via the input PCM highway PCM IN from a calling telephone. It adds this data to the time slot assigned to a receiving telephone and being transmitted through the output PCM highway PCM OUT, whereby the data is transmitted from the calling telephone to the receiving telephone.

The analog-line circuit assembly card 1 is connected to the lines assigned to telephone numbers. Several of the time slots used in the time-division multiplex transmission of digital data are assigned to the card 1. The card 1 can, therefore, use the time slots assigned to it to transmit data between the PCM highways, on the one hand, and the lines assigned to the telephone numbers, on the other. Some of the remaining time slots are assigned to the analog-trunk circuit assembly card 3, and some others of the remaining time slots are assigned to the digital-trunk circuit assembly card 5. The card 3 can use the time slots assigned to it, thereby to transmit data between the PCM highways, on the one hand, and the analog lines. Similarly, the card 5 can use the time slots assigned to it, to transmit data between the PCM highways, on the one hand, and the line terminal device 4.

Figure 2:
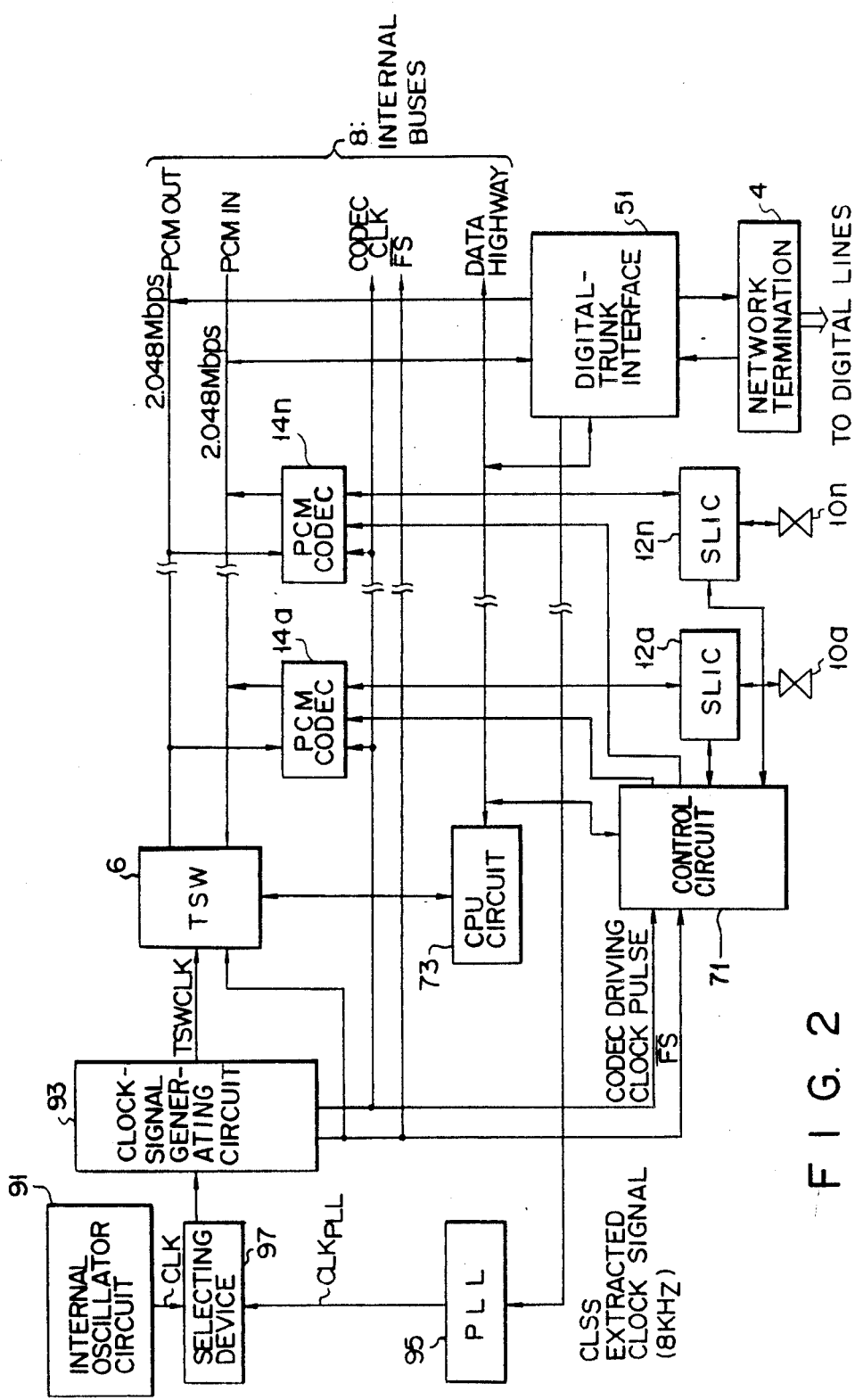
FIG. 2 is a block diagram showing major components of the embodiment of FIG. 1.

FIG. 2 is a block diagram which illustrates the telephone apparatus in greater detail. As is evident from FIG. 2, the analog-trunk circuit assembly card 3 comprises PCM codecs 14a to 14n and line-control circuit (SLICs) 12a to 12n. The digital-trunk circuit assembly card 5 comprises a digital-trunk interface 51. Telephones 10a to 10n are connected to the PCM codecs 14a to 14n by the SLICs 12a to 12n, which are interface circuits.

The SLICs 12a to 12n perform loop monitoring on the telephones 10a to 10n for off-hook signals and the dial signals. An off-hook signal or dial signal detected by an SLIC is output, in the form of serial data, to the data highway from a control circuit 71. The data on the data highway is input to a CPU circuit 73 for performing various operations and various controls. The CPU circuit 73 analyzes the dial signal input to it, in accordance with a prescribed program, thereby providing data for generating a ring-tone signal that is to be supplied via the telephone line assigned to the number of the receiving telephone. This data is supplied to the control circuit 71 through the data highway. The control circuit 71 generates a ring-tone signal from this data. The ring-tone signal is transmitted to the receiving telephone via the SLIC assigned to the receiving telephone. When the receiving telephone responds, the CPU circuit 73 gives a command through the control circuit 71 to the PCM codec coupled to both the calling telephone and the receiving telephone, thereby activating this PCM codec. The PCM codecs 14a to 14n, which usually remain on standby, become active upon receipt of the command supplied from the CPU circuit 73 to carry out AD/DA conversion of speech data.

The control circuit 71 and the CPU circuit 73 constitute the central control unit 7. The CPU circuit 73 control the TSW 6, such that the TSW 6 exchanges speech data between the telephones and performs time-division multiplex transmission of digital data between the telephones. PCM codes are input to the TSW 6 from the PCM codecs 14a to 14n via the input PCM highway PCM IN. The TSW 6 exchanges these PCM codes. The PCM codes, thus exchanged, are output via the output PCM highway PCM OUT. As in most conventional telephone apparatuses, PCM data for 32 channels is multiplexed on each PCM highway. In terms of time series, the PCM data items for the telephones are assigned to the 32 channels. More specifically, the PCM data item for the telephone 10a is assigned to the first channel, the PCM data item for the telephone 10b is assigned to the second channel, and so forth. To accomplish a dyadic talk between the first and second telephones 10a and 10b, for example, it suffices to exchange the PCM data items for these telephones with each other. Of the 32 channels, some are the input/output channels of the digital-trunk interface 51.

As is shown in FIG. 2, the electronic telephone apparatus further comprises an internal oscillator circuit 91, a clock-signal generating circuit 93, and a PLL circuit 95. The circuit 93 generates signals TSW CLK, CODEC CLK, and $\overline{FS}$ from the clock pulses output by the internal oscillator circuit 91 or from the clock pulses output by the PLL circuit 95. The signal TSW CLK is a drive signal for driving the TSW 6. The signal CODEC CLK is a drive signal for driving PCM codecs 14a to 14n. The signal $\overline{FS}$ is a drive signal for driving the control circuit 71.

As in most prior-art electronic telephone apparatuses, the PCM codecs 14a to 14n output a PCM code every 125 microseconds. Hence, the drive clock signal $\overline{FS}$ is formed of one-shot pulses at logic "0" level, generated at intervals of 125 microseconds. Data of 2.048 MB is transmitted every second through the PCM highway. Therefore, the drive clock signal CODEC CLK is a 2.048 MHz clock signal. Hence, the internal oscillator circuit 91 is designed to output a clock signal having a frequency which is an integral multiple of 2.048 MHz.

The digital-trunk interface 51 exchanges data and signals with the digital lines through the line-terminal device 4. The signal input to the interface 51 is an AMI (Alternate Mark Inversion) signal, which can be used to detect bipolar violation such as ZCS (Zero-Code Suppression) or B8ZS (Binary 8 Zero-Code Suppression). The digital-trunk interface 51 distributes signaling data such as a dial signal and an off-hook signal, and PCM data such as speech data, to the data highway and the PCM highway, respectively. The CPU circuit 73 controls the switching of data, functioning independently of the digital-trunk interface 51, in the same way as it controls the PCM codecs 14a to 14n, the TSW 6, and SLICs 12a to 12n. To transmit data via the digital lines, however, the PLL (Phase-Locked Loop) circuit 95 generates the clock signal $CLK_{PLL}$ from the clock signal extracted from the signals on the signal lines by the interface 51. This signal $CLK_{PLL}$ is supplied via a selecting device 97 to the clock-signal generating circuit 93. The circuit 93 generates clock signals TSW CLK, CODEC CLK, and $\overline{FS}$. Of these clock signals, the signal TSW CLK is used to control the TSW 6.

A clock signal is extracted from the clock signal $CLK_{PLL}$ by the clock-signal extracting circuit CLP incorporated in such a receiving circuit as is illustrated in FIG. 3. As is shown in FIG. 3, the receiving circuit comprises a receiving transformer TR, a NAND gate G1, and the clock-signal extracting circuit CLP. The middle tap of the secondary winding of the transformer TR is connected to ground. The ends of the secondary winding are connected by a resistor R1. The first end of the secondary winding is coupled to the base of a transistors Tr1 by a resistor R2. The second end of the secondary winding is connected to the base of a transistor Tr2 by a resistor R3. The bases of the transistors Tr1 and Tr2 are coupled to each other by a capacitor C1. The emitters of both transistors Tr1 and Tr2 are connected to the ground. The collectors of the transistors Tr1 and Tr2 are connected to the two inputs of the NAND gate G1, respectively. The output of the NAND gate G1 is coupled to the input of the clock-signal extracting circuit CLP. The circuit CLP comprises a resistor R6, a capacitor C2, a variable inductance L, a capacitor C3, and a high-gain amplifier AMP. The resistor R6 and the capacitor C2 form a differentiating circuit. The inductance L and the capacitor C3 constitute a parallel resonant circuit.

Figure 4:
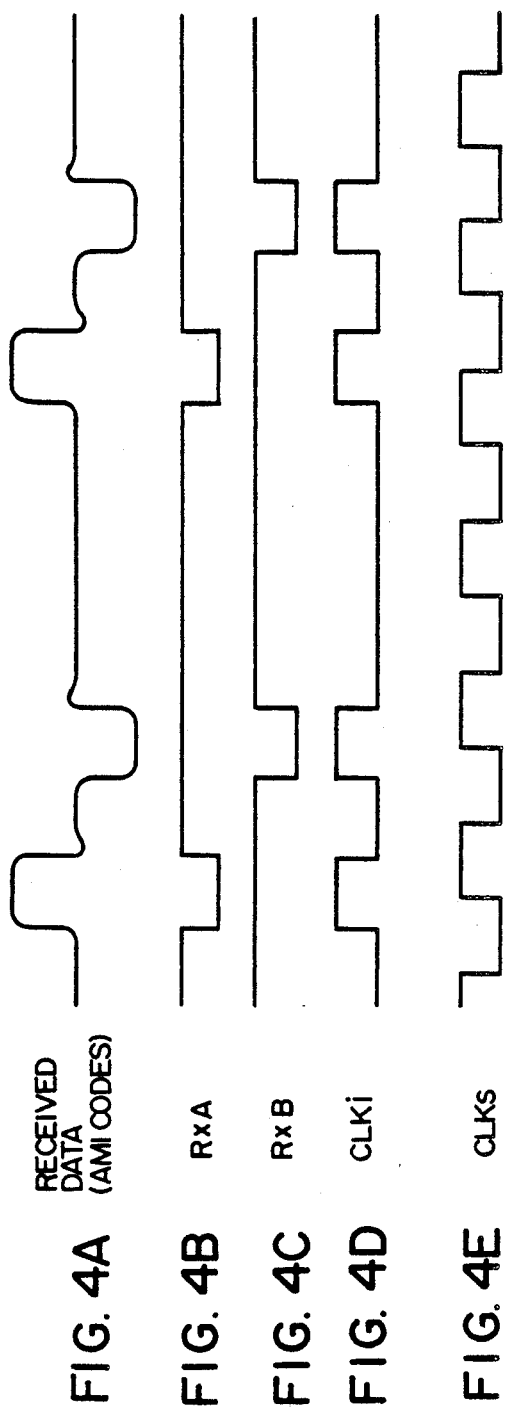
FIGS. 4A to 4E are a timing chart explaining the function of the circuit shown in FIG. 3.

In operation, the data, which varies as is shown in FIG. 4A, is input to the input terminals RxT and RxR of the primary winding of the transformer TR. A signal RxA is output from the collector of the transistor Tr1, which remains at logic "L" level while the input data is at logic "H" level as is illustrated in FIG. 4B. Meanwhile, a signal RxB is output from the collector of the transistor Tr2, which remains at logic "L" level while the input data is at logic "L" level as can be clearly understood from FIG. 4C. The signals RxA and RxB are input to the NAND gate G1. The NAND gate G1 outputs a signal CLKi which is a logical sum of the signals RxA and RxB as is evident from FIG. 4D. In the clock-signal extracting circuit CLP, the differentiating circuit, formed of the resistor R6 and the capacitor C6, differentiates the signal CLKi at the leading and trailing edges of each pulse of the signal CLKi, thereby generating a differential output signal. The differential output signal is supplied to the parallel resonant circuit made of the inductance L and the capacitor C3. The parallel resonant circuit conducts parallel resonance on the input signal, thereby producing a resonant signal. The high-gain amplifier AMP amplifies the resonant signal, thereby generating such an extracted clock signal CLKs as is shown in FIG. 4E.

Since the clock-signal extracting circuit CLP has an LC resonant circuit, it is relatively simple in structure. The LC resonant circuit, however, fails to generate clock pulses while the signal CLKi remains at the same level for an excessively long time, and the LC resonance voltage applied to the resonant circuit is inevitably too low. Therefore, it is required that clock pulses be generated to compensate for the insufficiency in the clock pulses produced by the LC resonant circuit. To this end, the extracted clock signal CLKs is input to the PLL circuit 95, which produces tens of clock pulses to make up for the insufficiency in the output pulses of the LC resonant circuit.

As has been described, a clock signal is extracted from the digital lines, in order to generate the clock signal TSW CLK. This is necessary for the following reason. The PCM code on the PCM highway, which has been produced by using the clock signal TSW CLK produced from the output of the internal oscillator circuit 91, has a frequency slightly different from that of the PCM code, which has been produced by using the clock signal TSW CLK extracted from the digital-trunk interface 51. The frequency difference, though small, makes it impossible to accomplish the phase matching of the PCM codes on the PCM highway.

The 8 KHz clock signal which the interface 51 has extracted from the digital lines is processed by the PLL circuit 96 into a clock signal $CLK_{PLL}$ which has a frequency identical to that of the clock signal CLK output by the internal oscillator circuit 91. When the circuit board, on which the digital-trunk interface 51 is mounted, is electrically disconnected from the electronic telephone apparatus for inspection, or when the digital-trunk interface 51 fails to function, there is the possibility that the clock-signal generating circuit 93 cannot generate various clock signals, and no switching operation can be effected even on the lines other than those directly connected to the digital-trunk circuit assembly card 5. In order to eliminate this risk, the selecting device 97 automatically supplies the clock signal output by the internal oscillator circuit 91, instead of the clock signal $CLK_{PLL}$ output by the PLL circuit 95, the moment the PLL circuit 95 stops outputting the clock signal $CLK_{PLL}$.

It will now be described how the electronic telephone apparatus enables the sender at the telephone 10a to talk with the respondent at the telephone 10b. When the sender takes the receiver of the telephone 10a off the cradle, the telephone 10a outputs a off-hook signal. When the sender dial the number of the telephone 10b, the telephone 10a outputs a dial signal. The SLIC 12, which is coupled to the telephone 10a and thus loop monitors the telephone 10a, detects both the off-hook signal and the dial signal. The SLIC 10a outputs these signals in the form of serial data, to the data highway. The data on the data highway is input to the CPU circuit 73. The CPU circuit 73 analyzes the dial signal in accordance with a prescribed program. The circuit 73 then supplies a control signal to the SLIC 12b coupled to the telephone 10b, so that a ringing-tone signal is supplied to the telephone 10b. When the telephone 10b, i.e., the receiving telephone, responds, the CPU circuit 73 gives a command to the PCM codecs 14a and 14b through the control circuit 71, thereby activating both codecs 14a and 14b. The codecs 14a and 14b, which are normally on standby, become active and start performing AD/DA conversion on the speech data.

The CPU circuit 73 controls the TSW 6 in order to exchange speeches between the calling telephone 10a and the receiving telephone 10b and also to achieve the control of the time-division multiplex transmission of data. More precisely, the PCM codes are input to the TSW 6 from the PCM codecs 14a and 14b through the input PCM highway PCM IN. The TSW 6 exchanges these PCM codes with each other. The PCM codes, thus exchanged, are output through the output PCM highway OUT. As has been described, the PCM data for 32 channels is multiplexed on each PCM highway. In terms of time series, the PCM data items for the telephones 10a, 10b, ... 10n are assigned to the 32 channels. To accomplish a dyadic talk between the first and second telephones 10a and 10b, it suffices to exchange the PCM data items for these telephones with each other. Some of the 32 channels are the input/output channels of the digital-trunk interface 51. Thus, when these input/output channel are used, the speech can be exchanged between the telephones 10a and 10b through the digital lines.

The clock-signal generating circuit 93 generates signals TSW CLK, CODEC CLK, and $\overline{FS}$, which are signals for driving the TSW 6, PCM codecs 14a to 14n, and the control circuit 71. The circuit 93 generates these drive clock signals, either from the clock signal output by the internal oscillator circuit 91, or from the clock signal output by PLL circuit 95. It is the selecting device 97 which selects the clock signal output by the oscillator circuit 91 or the clock signal output by the PLL circuit 85. The device 97 selects the clock signal produced by the PLL circuit 95 as long as no abnormality is found in this clock signal. The selecting device 97 comprises a triggerable one-shot multivibrator if it is to have the simplest structure. (A triggerable one-shot multivibrator is formed of a capacitor, resistor and other elements, and has a specific time constant.) The clock signal output from the PLL circuit 95 is input to the triggerable one-shot multivibrator of selecting device 97. When abnormality is found in this clock signal, the output of the multivibrator changes. In accordance with this change, the supply of the clock signal from the PLL circuit 95 to the selecting device 97 is stopped, and the clock signal output by the internal oscillator 91 is supplied to the selecting device 97.

It takes at least several milliseconds to detect the change of the output of the multivibrator. Hence, no clock pulses are supplied from the clock-signal generating circuit 93 for at least several milliseconds, every time the selecting device 97 switches the clock signal, from the signal $CLK_{PLL}$ to the signal CLK, or vice versa. During this period of several milliseconds, no data is exchanged between the calling telephone 10a and the receiving telephone 10b, and noise is probably added to the speech data.

Moreover, it is also possible that the 8 KHz extracted clock signal becomes unstable. This event is hard to detect within so short a time that the clock-signal generating circuit 93 continuously supplies clock signals.

To solve the problem described in the preceding paragraphs, the selecting device 97 can be replaced by the one shown in FIG. 5. The selecting device 97 shown in FIG. 5 has two frequency dividers 17 and 18, a timing-signal generating circuit 20, a timer 22, and a selector 24. The second frequency divider 17 divides the frequency of the clock signal CLK output from the external oscillator circuit 91. The first frequency divider 18 divides the frequency of the clock signal CLK PLL output from the PLL circuit 95. The outputs of both frequency dividers 17 and 18 are input to an exclusive-OR (EX-OR) circuit 19. The EX-OR circuit 19 detects the difference in frequency between the outputs of the frequency dividers 17 and 18. The timing-signal generating circuit 20 is driven by the clock signal CLK output by the internal oscillator circuit 91, and generates sampling pulses from the output of the first frequency divider 18. The sampling pulses generated by the circuit 20 are supplied to one of the two inputs of an AND gate 21. The output of the EX-OR circuit 19 is supplied to the other input of the AND gate 21. The AND gate 21 is opened and closed by the sampling pulses supplied from the circuit 20, thus sampling the signal output by the EX-OR circuit 19. The output of the AND gate 21 is input to the timer 22. The timer 22 measures the period between the time when abnormality is found in the clock signal $CLK_{PLL}$ and the time when the clock signal $CLK_{PLL}$ regains the normal state. An AND gate 23 is used to supply a stop signal to the timer 22. The timer 22 supplies an output Q to the selector 24. The selector 24 has two input terminals A and B, to which the clock signals $CLK_{PLL}$ and CLK supplied. The selector 24 selects the signal $CLK_{PLL}$ or the signal CLK in accordance with the output Q of the timer 22. The clock signal selected by the selector 24, either the signal $CLK_{PLL}$ or the signal CLK, is input to the clock-signal generating circuit 93. More precisely, the timer 22 counts the pulses of the clock signal $\overline{FS}$ supplied from the circuit 93. When its count reaches a predetermined value, the timer 22 causes the selector 24 to select the clock signal $CLK_{PLL}$. Then, the count of the timer 22 is cleared by the output of the EX-OR circuit 19 which has been supplied to the timer 22 via the AND gate 21, and the timer 22 causes the selector 24 to select the clock signal CLK. The selector 24 continuously selects the clock signal CLK until its count reaches the predetermined value again. The AND gate 23 remains open until the count of the timer 22 reaches said predetermined value.

As is shown in FIG. 5, a lock-preventing circuit 25 is provided which is designed to convert the clock signal $\overline{FS}$ into a one-shot pulse. The circuit 25 comprises a D flip-flop D-FF and a NAND gate G. The D flip-flop D-FF operates in synchronism with the clock signal CLK, and generates an output corresponding to the clock signal $\overline{FS}$. The NAND gate G has two input terminals, to which the clock signal $\overline{FS}$ and the Q output of the D flip-flop D-FF are supplied, respectively. The output of the NAND gate G is input, as clock signal $\overline{FS}$, to the selecting device 97. The lock-preventing circuit 25 converts the signal $\overline{FS}$ into a one-shot pulse to the switching circuit 97, thereby preventing the device 97 from being locked even if the signal $\overline{FS}$ remains active in case the supply of the signal $CLK_{PLL}$ is stopped while the signal $CLK_{PLL}$ remains in the normal state and is therefore being selected by the selector 24.

Figure 6:
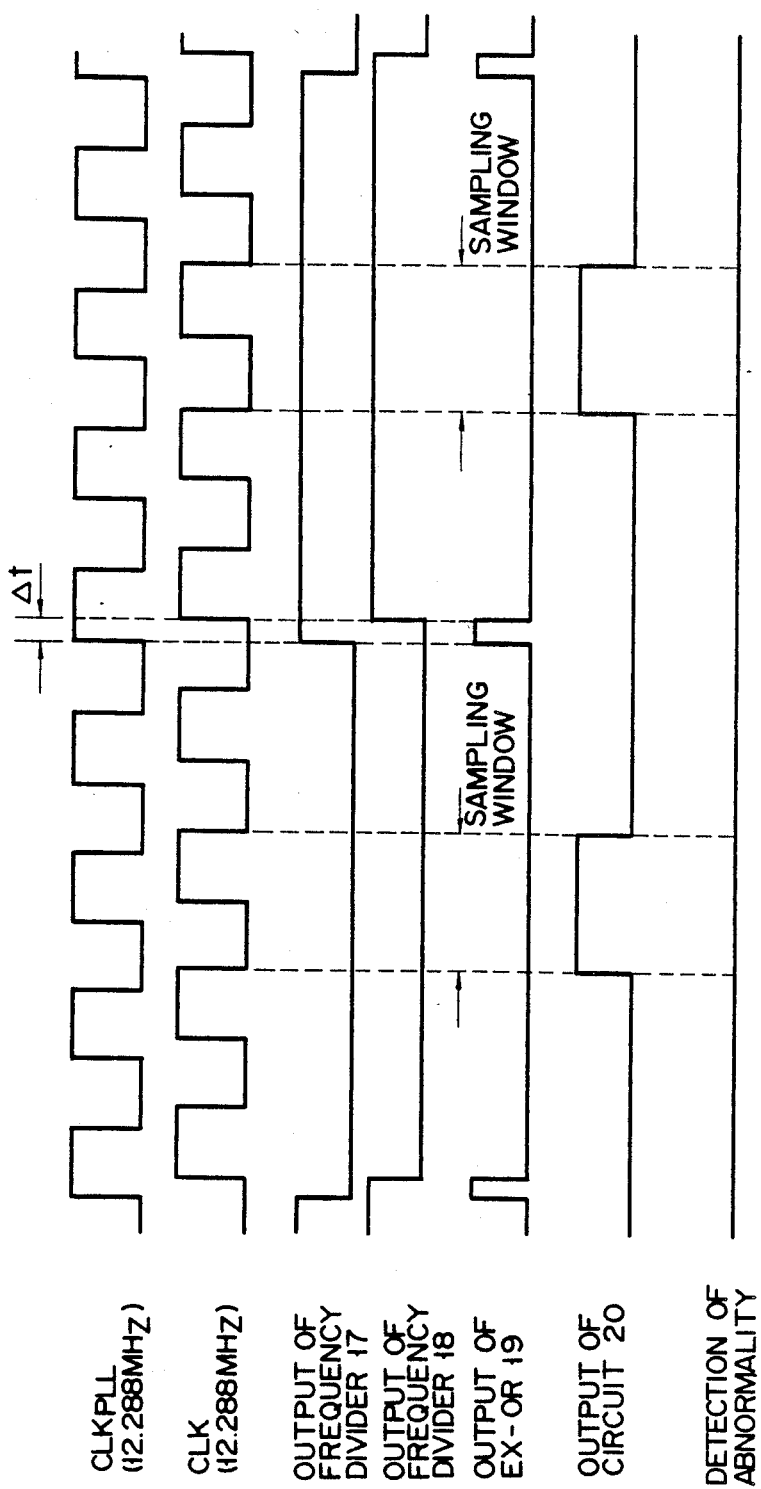
FIGS. 6 and 7 are timing charts explaining the function of the switching device.

With reference to the timing chart of FIG. 6, it will be explained how the selecting device 97 operates when the logic signal $CLK_{PLL}$, which is normal, is input to the second frequency divider 17. In this instance, both clock signals $CLK_{PLL}$ and CLK have a frequency of 12.288 MHz with a tolerance of ±100 ppm. or less. Hence, the difference in frequency between these clock signals $CLK_{PLL}$ and CLK is equivalent to 0.3 pulse for every 125 microseconds, i.e., the duration of the clock signal $\overline{FS}$. As long as the clock signal $CLK_{PLL}$ is a normal one, the output signals of the frequency dividers 17 and 18, which frequency-divide the signals CLK PPL and CLK, respectively, have the same frequency, though they have a phase difference, if both frequency dividers are periodically reset. In this embodiment, the frequency dividers 17 and 18 are reset by the pulses of the logic signal $\overline{FS}$, which the circuit 93 has generated at intervals of 125 microseconds and which are at logic "L" level. Therefore, the count difference between the frequency dividers 17 and 18, which occurs every 125 microseconds, decreases to ± one clock pulse or less. The phase difference Δt between the signals $CLK_{PLL}$ and CLK (FIG. 6) is, at most, about 80 nanoseconds which is equivalent to the width of one 12.288 MHz clock pulse.

The EX-OR circuit 19 generates an exclusive logical sum of the outputs of the second frequency divider 17 and the first frequency divider 18. Hence, when the outputs of the frequency dividers 17 and 18 do not coincide, the EX-OR circuit 19 produces an output at the logic "H" level. Since the signals CLK and $CLK_{PLL}$ have a phase difference, they are not identical during the period of Δt even if the signal $CLK_{PLL}$ is normal. Therefore, the timing-signal generating circuit 20 forms a sampling window having a duration equivalent to one clock pulse, as is illustrated in FIG. 6, thereby to sample the output of the EX-OR circuit 19. The AND gate 21 is therefore opened for the duration of this sampling window. Thus, the output of the EX-OR circuit 19 is monitored for this duration.

As a result, there are two conditions under which the EX-OR circuit 19 can detect non-coincidence between the clock signals CLK and $CLK_{PLL}$. The first condition is that the signal $CLK_{PLL}$ comes to have abnormality, that is the signal $CLK_{PLL}$ is delayed with respect to the signal CLK or stopped, such that the signals CLK and $CLK_{PLL}$ have a phase difference Δt of about 120 nanoseconds or more, which is equivalent to 1.5 clock pulses or more for every 125 microseconds. The second condition is that the frequency of the signal $CLK_{PLL}$ is higher than that of the signal CLK, such that the signals CLK and $CLK_{PLL}$ have a phase difference Δt of about 120 nanoseconds or more, which is equivalent to 1.5 clock pulses or more for every 125 microseconds. Hence, when the clock signal $CLK_{PLL}$ comes to have abnormality, this abnormality can be detected within a time equivalent to, at most, three pulses of the clock signal CLK, i.e., at most about 250 nanoseconds.

Figure 7:
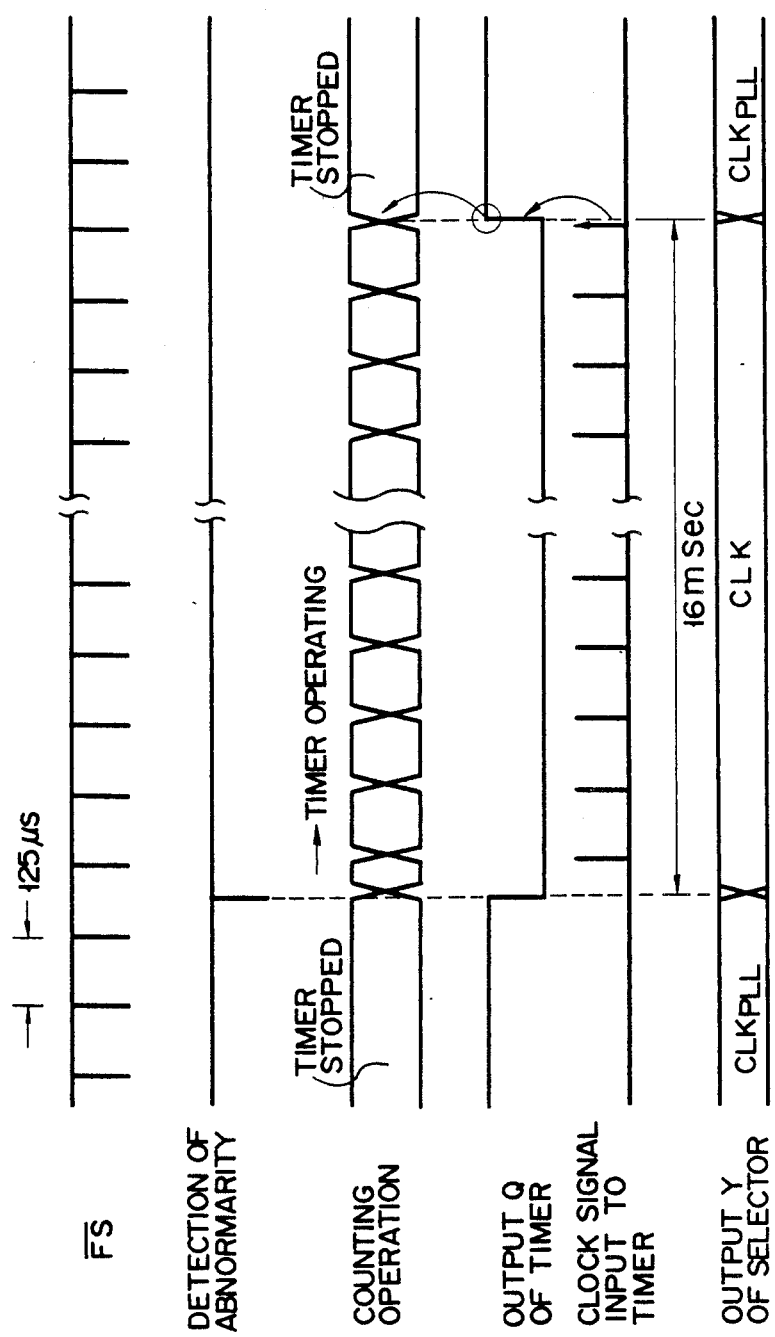

With reference to the timing chart of FIG. 7, it will be explained how abnormality, if any, is found in the clock signal $CLK_{PLL}$. When the signal $CLK_{PLL}$ becomes abnormal, the output of the AND gate 21 rises to the logic "H" level. As a result, the timer 22 is cleared, and the output Q of the timer 22 falls to the logic "L" level. The selector 24 therefore selects the clock signal CLK supplied from the internal oscillator circuit 91 to the input terminal B. The timer 22 starts counting the pulses of the clock signal $\overline{FS}$. The output of the timer 22 rises to the logic "H" level if no abnormality is found in the clock signal $CLK_{PLL}$ for some time. The output Q at the logic "H" level is supplied to the AND gate 23 via an inverter. Hence, the AND gate 23 closes, and the clock signal CLK is no longer supplied to the timer 22 through the AND gate 23. As long as the clock signal $CLK_{PLL}$ is normal, the AND gate 23 remains closed. The output Q of the inverter, i.e., the level-inverted output of the timer 22, is supplied as a switching signal to the selector 24. In response to the output Q of the inverter, the selector 24 selects the clock signal $CLK_{PLL}$ supplied from the PLL circuit 95 to the input terminal A. Upon measuring a predetermined period of time, the timer 22 supplies a switching signal to the selector 24, whereby the selector switches the clock signal from the signal CLK to the signal $CLK_{PLL}$. This serves the purpose of providing time which the clock signal $CLK_{PLL}$ requires to become stable after it has regains normality. A few tens of milliseconds is sufficient as this period of time. In the embodiment of FIG. 5, this time is about 16 milliseconds.

As has been described, when the clock signal $CLK_{PLL}$ becomes normal, the selector 24 switches the clock signal form the signal CLK to the signal $CLK_{PLL}$. This switching of signals is asynchronous with the clock signal $CLK_{PLL}$. Hence, it cannot be determined at which part of the signal $CLK_{PLL}$ this switching takes place. No margin for the clock-pulse width cannot be obtained, which may cause the electronic telephone apparatus to malfunction.

Figure 8:
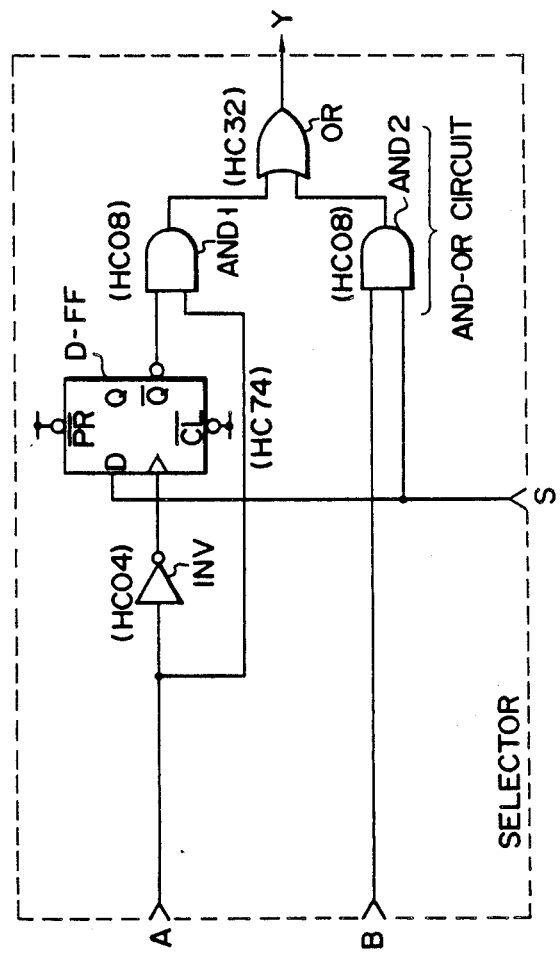
FIG. 8 is a circuit diagram illustrating a selector circuit used in another embodiment of the present invention.

FIG. 8 shows a selector which is designed to provide a sufficient margin for the clock-pulse width. As is shown in FIG. 8, this selector 24 has a select terminal S. The output Q of the timer 22 is input to the select terminal S. The output Q is synchronous with the clock signal CLK supplied to the input terminal B of the selector 24. When the clock signal, is switched from the signal CLK to the signal $CLK_{PLL}$, the apparatus is asynchronous with the clock signal $CLK_{PLL}$ since the switching of the clock signal is achieved in synchronism with the clock signal CLK supplied to the input terminal B. The clock signal $CLK_{PLL}$ is input to the first of the two inputs of an AND gate AND1, and also to the clock terminal CL of a D flip-flop D-FF through an inverter INV. The output Q of the timer 22 is the D terminal of D flip-flop D-FF. The output Q of the D flip-flop D-FF is input to the second input of the AND gate AND1. The output of this AND gate AND1 is output via an OR gate OR. The clock signal CLK supplied to the input terminal B is input to an AND gate AND2, along with the output Q of the timer 22. The output of the AND gate AND2 is output through the OR gate OR.

As can be understood from FIG. 8, the AND gates AND1 and AND2 and the OR gate OR constitute an AND-OR circuit. The D flip-flop D-FF, which is in the stage preceding this AND-OR circuit, is set at the leading edge of the lock signal $CLK_{PLL}$ supplied to the input terminal A when this clock signal $CLK_{PLL}$ has no abnormality. Hence, the clock signal $CLK_{PLL}$ is selected as output Y of the selector 24 and supplied through the AND gate AND1 and the OR gate OR. When abnormality is found in the clock signal $CLK_{PLL}$ and the output Q of the timer 22 therefore rises to the logic "H" level, the clock signal CLK supplied to the input terminal B is output as output signal Y of the selector 24 and supplied through the AND gate AND2 and the OR gate OR.

As has been explained, in the electronic telephone apparatus according to the invention, the 8 KHz clock signal which the interface has extracted from the digital lines is processed by the PLL circuit into a clock signal $CLK_{PLL}$ of the same frequency as that of the clock signal CLK output by the internal oscillator circuit. The clock signal $CLK_{PLL}$, thus generated, is used to drive the components of the telephone apparatus. This clock signal is monitored. When abnormality is found in the clock signal, the clock signal CLK is selected and drives the components of the telephone apparatus. The clock signal $CLK_{PLL}$ has abnormality when the circuit board, on which the digital-trunk interface is mounted, is electrically disconnected from the electronic telephone apparatus for inspection, or when the digital-trunk interface fails to function. Therefore, the telephone apparatus can correctly function even if the circuit board is electrically disconnected from it for inspection, or if the digital-trunk interface malfunctions.

The switching circuit incorporated in the electronic telephone apparatus has a timer and a selector. The timer counts the pulses of the reference clock signal, which the oscillator circuit has generated for a predetermined period of time, and also the clock pulses extracted from the digital lines for the same period of time. When the difference in number between the clock pulses output by the oscillator circuit and the clock pulses extracted from the digital lines increases over the predetermined value, the timer outputs a switching signal to the selector. In response to the switching signal, the selector selects the reference clock signal.

In other words, when the difference in number between the clock pulses output by the oscillator circuit and the pulses of the clock signal generated by the clock-signal generating circuit increases over the predetermined value within the predetermined period of time, it is determined that this clock signal has abnormality. If this is the case, the reference clock signal is used, in place of the clock signal generated by the clock-signal generating circuit. This switching of the clock signal is performed as soon as the printed circuit board is disconnected from the electronic telephone apparatus, or as soon as a problem occurs either in the printed circuit board or in the signal line to which the trunk circuit is connected. Thus, the electronic telephone apparatus neither stops functioning, nor renders telephone talks impossible.

What is claimed is:

1. An electronic telephone apparatus comprising:
   clock signal generating means for generating a first clock signal on the basis of a clock signal extracted from external digital line means,
   oscillator means for generating a second clock signal having the same frequency as said first clock signal; and
   switching means for monitoring abnormality of the first clock signal, selecting the first reference clock signal when no abnormality is found in the first clock signal, and selecting the second clock signal when abnormality is found in the first clock signal,
   wherein said switching means comprises:
   first frequency-dividing means for dividing the frequency of the first clock signal output from the clock signal generating means, to generate a signal having a specific frequency;
   second frequency-dividing means for dividing the frequency of said second clock signal output from the oscillator means, thereby generating a signal having the same frequency as that of the signal generated by said first frequency-dividing means; and
   detector means for comparing the signals output from said first and second frequency-dividing means, thereby detecting non-coincidence between the signals thus compared.

2. An electronic telephone apparatus comprising:
   clock signal generating means for generating a first clock signal on the basis of a clock signal extracted from external digital line means,
   oscillator means for generating a second clock signal having the same frequency as said first clock signal; and
   switching means for monitoring abnormality of the first clock signal, selecting the first reference clock signal when no abnormality is found in the first clock signal, and selecting the second clock signal when abnormality is found in the first clock signal,
   wherein said switching means comprises:
   first frequency-dividing means for dividing the frequency of the second clock signal output from the oscillator means, thereby generating a signal having a specific frequency;
   second frequency-dividing means for dividing the frequency of said first clock signal output from the oscillator means, thereby generating a signal having the same frequency as that of the signal generated by said first
   detector means for comparing the signals output from said first and second frequency-dividing means, thereby detecting non-coincidence between the signals, and outputting a non-coincidence signal; and
   control means for carrying out a counting operation in synchronism with the first clock signal output from the clock signal generating means, selecting the second reference clock signal output from the oscillator means when said control means is reset by the non-coincidence signal output by said detector means and the counted value reaches a predetermined value, and selecting the first clock signal output from the clock signal generating means when said control means is reset.

3. An electronic telephone apparatus comprising:

a trunk circuit connected between an external digital line and an internal highway for transmitting signals therebetween and extracting sync clock signals from the digital line;

sync signal generating means for generating first clock signals of a predetermined frequency from the sync clock signals extracted by the trunk circuit;

oscillator means for generating second clock signals similar to the first clock signals output from said sync signal generating means;

selector/output means for monitoring the first clock signals output from the sync signal generating means, outputting the first clock signals when no abnormality is found in the first clock signals, and outputting the second clock signals when abnormality is found in the first clock signals; and a time-division switch driven by the second clock signals output from the selector/output means, for performing time-division multiplexing on the data being transmitted through the highway, wherein said selector/output means comprises:

first frequency-dividing means for dividing the frequency of said first clock signal output from the sync signal generating means, thereby generating a signal having a specific frequency;

second frequency-dividing means for dividing the frequency of said first clock signals output from the oscillator means, thereby generating a signal having the same frequency as that of the signal generated by said first frequency-dividing means; and detector means for comparing the signals output from said first and second frequency-dividing means, thereby detecting non-coincidence between the signals thus compared.

4. An electronic telephone apparatus comprising:

a trunk circuit connected between an external digital line and an internal highway for transmitting signals therebetween and extracting sync clock signals from the digital line;

sync signal generating means for generating first clock signals of a predetermined frequency from the sync clock signals extracted by the trunk circuit;

oscillator means for generating second clock signals similar to the first clock signals output from said sync signal generating means;

selector/output means for monitoring the first clock signals output from the sync signal generating means, outputting the first clock signals when no abnormality is found in the first clock signals, and outputting the second clock signals when abnormality is found in the first clock signals; and a time-division switch driven by the second clock signals output from the selector/output means, for performing time-division multiplexing on the data being transmitted through the highway, wherein said selector/output means comprises:

first frequency-dividing means for dividing the frequency of the first clock signals output from the sync signal generating means, thereby generating a signal having a specific frequency;

second frequency-dividing means for dividing the frequency of said second clock signals output from the oscillator means, thereby generating a signal having the same frequency as that of the signal generated by said first frequency-dividing means;

detector means for comparing the signals output from said first and second frequency-dividing means, thereby detecting non-coincidence between the signals, and outputting a non-coincidence signal;

control means for carrying out a counting operation in synchronism with the first clock signal output from the clock signal generating means, and generating a switching signal as to select the second reference clock signal output from the oscillator means when said control means reset by the non-coincidence signal output from said detector means and the counted value reaches a predetermined value, and to select the first clock signal output from the clock signal generating means when said control means is reset; and switching means for allowing passage of the selected clock signal in response to the switching signal output by said control means.

5. The electronic telephone apparatus according to claim 4, wherein said selector means comprises:

a first gate which opens in response to the first level of the switching signal output by said control means, thereby to allow the passage of the second reference clock signal; and a second gate which opens at an edge of the first reference clock signal in response to the second level of the switching signal output by said control means, thereby to allow the passage of the first reference clock signal.

6. An electronic exchange apparatus comprising:

clock signal generating means for generating a first clock signal on the basis of a clock signal extracted from an external digital line, oscillator means for generating a second clock signal having the same frequency as said first clock signal; and switching means for monitoring abnormality of the first reference clock signal generated from the first clock signal, selecting the first reference clock signal when no abnormality is found in the first clock signal, and selecting the second clock signal when abnormality is found in the first clock signal, wherein said switching means includes:

first means for dividing the first clock signal and generating a clock signal having an extended time period;

second means for dividing the second clock signal and generating a clock signal having an extended time period;

abnormality detecting means for comparing the output signals from the first and second means;

gate means for extracting an abnormality detection signal from the abnormality detecting means at a predetermined timing and for outputting the abnormality detection signal; and selector means for receiving the first clock signal and the second clock signal, passing the first clock signal in a normal state, and passing the second clock signal when the gate means outputs the abnormality detection signal.

7. An electronic exchange apparatus comprising:

clock signal generating means for generating a first clock signal on the basis of a clock signal extracted from an external digital line, oscillator means for generating a second clock signal having the same frequency as said first clock signal; and switching means for monitoring abnormality of the first reference clock signal generated from the first clock signal, selecting the first reference clock signal when no abnormality is found in the first clock signal, and selecting the second clock signal when abnormality is found in the first clock signal, wherein said switching means includes:

first means for dividing the first clock signal and generating a clock signal having an extended time period;

second means for dividing the second clock signal and generating a clock signal having an extended time period;

abnormality detecting means for comparing the output signals from the first and second means;

gate means for extracting an abnormality detection signal from the abnormality detecting means at a predetermined timing and for outputting the abnormality detection signal;

first selector means for receiving the first clock signal and the second clock signal, passing the first clock signal in a normal state, and passing the second clock signal when the gate means outputs the abnormality detection signal;

holding means for holding the abnormality detection signal for a predetermined time period when it is output from the gate means; and second selector means for receiving the first clock signal and the second clock signal, allowing passage of the first clock signal when no abnormality is detected, and allowing the passage of the second clock signal while the holding means holds the abnormality detection signal output from the gate means.

8. An electronic exchange apparatus comprising:

a trunk circuit connected between an external digital line and an internal highway for transmitting signals therebetween and extracting sync clock signals from the digital line;

sync signal generating means for generating first clock signals of a predetermined frequency from the sync clock pulses extracted by the trunk circuit;

oscillator means for generating second clock signals similar to the first clock signals output from said sync signal generating means;

selector/output means for monitoring the first clock signals output from the sync signal generating means, outputting the first clock signals when no abnormality is found in the first clock signals, and outputting the second clock signals when abnormality is found in the first clock signals; and a time-division switch driven by the second clock signals output from the selector/output means, for performing time-division multiplexing on the data being transmitted through the highway, wherein said selector/output means includes:

first means for dividing the first clock signal and generating a clock signal having an extended time period;

second means for dividing the second clock signal and generating a clock signal having an extended time period;

abnormality detecting means for comparing the output signals from the first and second means;

gate means for extracting an abnormality detection signal from the abnormality detecting means at a predetermined timing and for outputting the abnormality detection signal; and selector means for receiving the first clock signal and the second clock signal, passing the first clock signal in a normal state, and passing the second clock signal when the gate means outputs the abnormality detection signal.

9. An electronic exchange apparatus comprising:

a trunk circuit connected between an external digital line and an internal highway for transmitting signals therebetween and extracting sync clock signals from the digital line;

sync signal generating means for generating first clock signals of a predetermined frequency from the sync clock pulses extracted by the trunk circuit;

oscillator means for generating second clock signals similar to the first clock signals output from said sync signal generating means;

selector/output means for monitoring the first clock signals output from the sync signal generating means, outputting the first clock signals when no abnormality is found in the first clock signals, and outputting the second clock signals when abnormality is found in the first clock signals; and a time-division switch driven by the second clock signals output from the selector/output means, for performing time-division multiplexing on the data being transmitted through the highway, wherein said selector/output means includes:

first means for dividing the first clock signal and generating a clock signal having an extended time period;

second means for dividing the second clock signal and generating a clock signal having an extended time period;

abnormality detecting means for comparing the output signals from the first and second means;

gate means for extracting an abnormality detection signal from the abnormality detecting means at a predetermined timing and for outputting the abnormality detection signal;

holding means for holding the abnormality detection signal for a predetermined time period when it is output from the gate means; and selector means for receiving the first clock signal and the second clock signal, allowing passage of the first clock signal when no abnormality is detected, and allowing the passage of the second clock signal while the holding means holds the abnormality detection signal output from the gate means.

* * * * *